(12) United States Patent
Weber et al.

(10) Patent No.: US 10,947,679 B2
(45) Date of Patent: Mar. 16, 2021

(54) SLIDING PENDULUM BEARING AND METHOD OF DIMENSIONING SUCH A BEARING

(71) Applicant: MAURER ENGINEERING GMBH, München (DE)

(72) Inventors: Felix Weber, Pfaffhausen (CH); Christian Braun, Holzkirchen (DE)

(73) Assignee: MAURER ENGINEERING GMBH, Munich (DE)

(*) Notice: Subject to any disclaimer, the term of this patent is extended or adjusted under 35 U.S.C. 154(b) by 0 days.

(21) Appl. No.: 16/485,628

(22) PCT Filed: Feb. 13, 2018

(86) PCT No.: PCT/EP2018/053567
§ 371 (c)(1),
(2) Date: Aug. 13, 2019

(87) PCT Pub. No.: WO2018/149828
PCT Pub. Date: Aug. 23, 2018

(65) Prior Publication Data
US 2019/0368138 A1     Dec. 5, 2019

(30) Foreign Application Priority Data
Feb. 14, 2017   (DE) ............... 10 2017 202 317.1

(51) Int. Cl.
*F16C 23/04*     (2006.01)
*E01D 19/04*     (2006.01)
(Continued)

(52) U.S. Cl.
CPC .......... *E01D 19/046* (2013.01); *E04H 9/021* (2013.01); *E02D 27/34* (2013.01); *E04B 1/36* (2013.01); *F16C 23/043* (2013.01); *F16C 33/02* (2013.01)

(58) Field of Classification Search
CPC ......... E04H 9/021; E04H 9/023; E04H 9/046; F16C 23/043
(Continued)

(56) References Cited

U.S. PATENT DOCUMENTS

| 8,371,075 | B2 * | 2/2013 | Huber | .................... E04H 9/023 52/167.9 |
| 8,484,911 | B2 * | 7/2013 | Zayas | .................... E04H 9/023 248/562 |

(Continued)

FOREIGN PATENT DOCUMENTS

| DE | 10 2005 060 375 A1 | 6/2007 |
| KR | 10 1 410 025 B1 | 6/2014 |

(Continued)

*Primary Examiner* — Phillip A Johnson
(74) *Attorney, Agent, or Firm* — BakerHostetler

(57) ABSTRACT

A sliding pendulum bearing is used to protect a construction against dynamic stresses from predominantly horizontal earthquake excitation with a first sliding plate, a second sliding plate and a slider movably arranged between both sliding plates, wherein each of the two sliding plates has a curved main sliding surface and the slider is in surface contact with a first main sliding surface of the first sliding plate and with a second main sliding surface of the second sliding plate, wherein the first main sliding surface is designed for a first load case and the second main sliding surface is designed for a second load case which differs from the first load case.

22 Claims, 7 Drawing Sheets

(51) Int. Cl.
  *E04H 9/02* (2006.01)
  *E02D 27/34* (2006.01)
  *E04B 1/36* (2006.01)
  *F16C 33/02* (2006.01)

(58) Field of Classification Search
  USPC .......................................................... 384/36
  See application file for complete search history.

(56) References Cited

U.S. PATENT DOCUMENTS

| | | | |
|---|---|---|---|
| 8,641,282 B2* | 2/2014 | Chuang | F16C 29/001 |
| | | | 384/36 |
| 8,696,205 B2* | 4/2014 | Tavecchio | E01D 19/041 |
| | | | 384/36 |
| 2015/0191881 A1* | 7/2015 | Kim | E01D 19/046 |
| | | | 384/36 |
| 2016/0348389 A1 | 12/2016 | Connesson et al. | |

FOREIGN PATENT DOCUMENTS

| | | |
|---|---|---|
| WO | 2012/114246 A1 | 8/2012 |
| WO | 2014/173622 A1 | 10/2014 |

* cited by examiner

State of the art

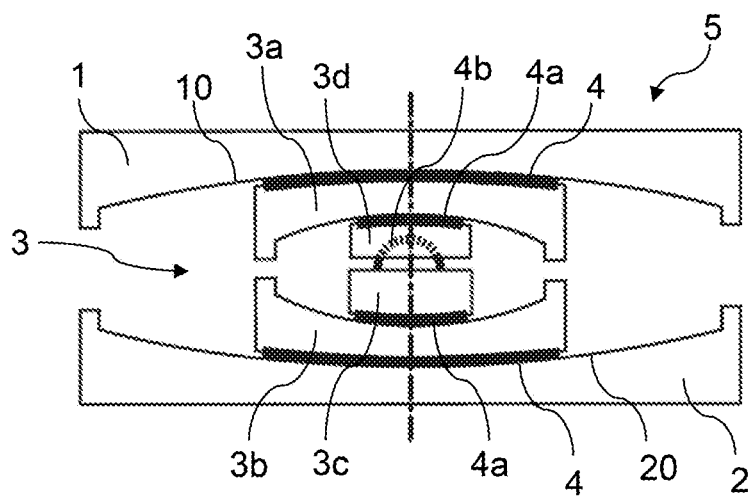
Fig. 1D
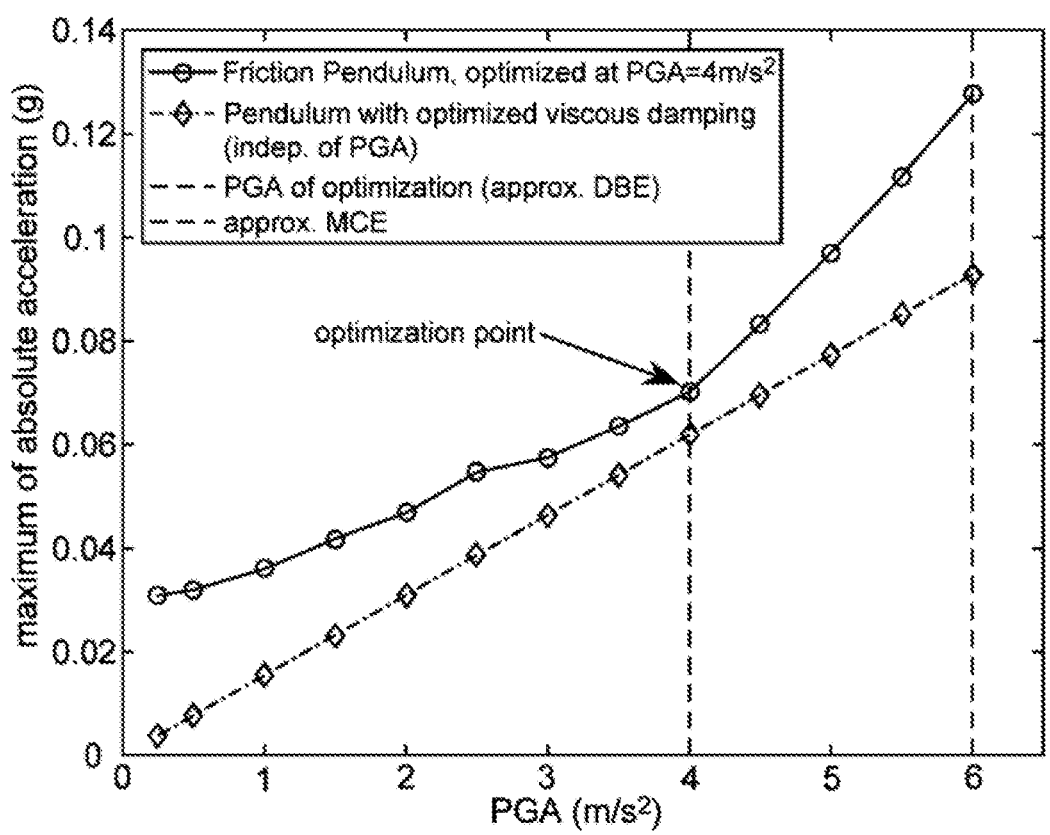
Fig. 1E      State of the art

SLIDING PENDULUM BEARING AND METHOD OF DIMENSIONING SUCH A BEARING

CROSS-REFERENCE TO RELATED APPLICATIONS

This application is a National Stage of International patent application No. PCT/EP2018/053567, filed on Feb. 13, 2018, which claims priority to foreign German patent application No. DE 10 2017 202 317.1, filed on Feb. 14, 2017, the disclosures of which are incorporated by reference in their entirety.

FIELD OF THE INVENTION

The present invention concerns a sliding pendulum bearing for the protection of a construction against dynamic stresses from predominantly horizontal impacts as well as a method for dimensioning such sliding pendulum bearings.

BACKGROUND

Generic sliding pendulum bearings usually have a first sliding plate, a second sliding plate and a slider movably arranged between the two sliding plates, wherein each of the two sliding plates has a curved main sliding surface and the slider is in surface contact with a first main sliding surface of the first sliding plate and with a second main sliding surface of the second sliding plate.

Such sliding pendulum bearings and corresponding dimensioning methods for such sliding pendulums are in principle sufficiently known from the state of the art.

Such sliding pendulum bearings are used in particular for earthquake isolation of constructions, such as houses or bridges, whose first natural frequency is typically in the range of about 0.5 Hz to 2 Hz. In particular, the curved main sliding surfaces can be spherically curved according to DIN EN 15129:2010. If the first natural frequency is significantly lower than 0.5 Hz, the construction is sufficiently protected against earthquake-induced ground vibrations thanks to its long vibration cycle duration. If, however, the first natural frequency is higher than 2 Hz, an earthquake cannot cause any significant displacements of the construction and associated damage due to the high rigidity of the construction.

At present, four main types of different sliding pendulum bearings are known. These are shown schematically in FIGS. 1A to 1D and are briefly explained in the following.

On the one hand there is the sliding pendulum bearing 5 of the type "single curved surface slider" (hereinafter referred to as "single") schematically shown in FIG. 1A, in which a first sliding plate 1 is in surface contact with a slider 3 via a first curved main sliding surface 10 and a second sliding plate 2 is in surface contact with the slider 3 via a second curved main sliding surface 20. In the case of the single shown here, sliding elements 4 are arranged between the slider 3 and the two main sliding surfaces 10 and 20 in order to be able to adjust the friction properties between the slider 3 and the two main sliding surfaces 10 and 20 of the sliding plates 1 and 2.

The peculiarity of the Single design is that the isolation behaviour of the sliding pendulum bearing is essentially defined by the contact surface between the first main sliding surface 10 and the slider 3. In contrast, the second sliding plate 2 with its second main sliding surface 20 is essentially provided for preventing the slider 3 from being clamped to the first main sliding surface 10 by rotation and thus ensuring optimum contact between the slider 3 and the first main sliding surface 10 of the first sliding plate 1.

If the single is now designed for a specific earthquake with a corresponding peak ground acceleration, then only the contact between the first sliding plate 1 and the slider 3 is designed for a corresponding load case.

The term "to design" refers in particular to optimizing the geometry and friction behaviour of the contact surface between the slider 3 and the corresponding sliding plate 1. This can be done, for example, with the aid of a linear response spectrum or nonlinear simulation. In this optimization process, a compromise must always be found between the isolation effect of the sliding pendulum bearing and the displacement capacity to be maintained for the bearing movement of the sliding pendulum bearing. This means that a perfect isolation of the construction movement from a ground movement is desired, but this can only be achieved with a very large radius of curvature of the sliding plate 1, which, however, requires a rather large displacement capacity of the bearing and the construction may no longer be at the same location after the earthquake (see: "Back centering error"). However, since the possible displacement capacity for the bearing movement is limited by the given installation space and a minimally defined recentring capacity must be guaranteed, the isolation effect cannot be maximized.

So what is meant by "to design" can be illustrated, for example, by FIG. 1E.

FIG. 1E shows a diagram showing the course of the maximum absolute construction acceleration as a function of a peak ground acceleration (PGA) caused by a corresponding earthquake. From the large number of conceivable values for peak ground acceleration, two values in particular are decisive for the design of sliding pendulum bearings. On the one hand, it is the value of the peak ground acceleration of the so-called design basis earthquake (DBE), which is assumed to be 4 m/s$^2$ in the example shown in FIG. 1E. On the other hand, it is the value of the peak ground acceleration of the so-called maximum credible earthquake (MCE) which is assumed to be 6 m/s$^2$ in the example shown in FIG. 1E. The design basis earthquake corresponds to the earthquake for which the intended construction should be best isolated from earthquake excitation. The maximum credible earthquake, however, is the maximum earthquake to be expected at the site of the construction. The value of the peak ground acceleration of the maximum credible earthquake is greater than that of the design basis earthquake and can also be defined as a multiple, for example 1.5 times, of the value of the peak ground acceleration of the design basis earthquake. For earthquakes with peak ground acceleration values between the peak ground acceleration value of the design basis earthquake and the maximum credible earthquake, damage may occur to the construction, but these can still be repaired.

As shown in FIG. 1E, the maximum absolute construction acceleration for a sliding pendulum bearing without friction but with optimized viscous damping (cf.: curve to "Pendulum with optimized viscous damping"), in the following referred to as sliding pendulum bearing with optimized viscous damping, is linear as a function of the peak ground acceleration. This curve reflects the ideal isolation of the construction with a passive isolator. However, the combination of a sliding pendulum bearing with an optimized viscous damper is expensive, which is why in practice sliding pendulum bearings with friction are used.

FIG. 1E shows, in addition to the curve for the sliding pendulum bearing with optimized viscous damping, an exemplary curve for the maximum absolute construction accelerations of a sliding pendulum bearing with friction (cf.: curve for "Friction Pendulum"). Here it can be seen that the isolation behaviour for conventional structural bearings does not develop linearly as a function of the peak ground acceleration. Thus it is generally not possible for sliding pendulum bearings with friction to come close to the behaviour of the sliding pendulum bearing with optimized viscous damping for a large number of peak ground acceleration values.

The aim of the designing or optimization of the sliding pendulum bearing with friction should therefore be to adapt the geometry and the friction values of the sliding pendulum bearing so that the maximum absolute construction acceleration at the value for the peak ground acceleration shows a similar behavior as a sliding pendulum bearing with optimized viscous damping.

As already described above, for a sliding pendulum bearing designed as a single (see FIG. 1A), the second sliding plate 2 with its second main sliding surface 20 is necessary for the rotation of the slider 3. To ensure that the slider rotates as smoothly as possible, the second main sliding surface 20 is lubricated, so that its coefficient of friction is very low (often in the range of 0.4% to 1.5%) and this friction must not be included in the friction of the first main sliding surface 10. Thus the isolation behaviour of a sliding pendulum bearing designed as a single (see FIG. 1A) is defined solely by the curvature and friction of the first main sliding surface 10.

As a further development of the Single shown in FIG. 1A, the Double type sliding pendulum bearing (hereinafter referred to as "Double") is known, which is shown in FIG. 1B and is referred to as the "double curved surface slider" in English.

Similar to the single, the double has a first sliding plate 1 with a first main sliding surface 10, a second sliding plate 2 with a second main sliding surface 20, a slider 3 and two sliding elements 4.

In contrast to the Single, however, the second main sliding surface 20 is identical to the first main sliding surface 10 in terms of its effective radius and coefficient of friction. In order to guarantee identical isolating cycle durations for the Single (5 in FIG. 1A) and Double (5 in FIG. 1B), the sum of the two effective radii of the Double is selected to be equal to the effective radius of the Single. Since the two effective radii and the two coefficients of friction of the Double are usually selected equally, the entire bearing movement of the Double is evenly distributed over the main sliding surfaces 10 and 20 of the Double. Therefore, the maximum sliding paths on the main sliding surfaces 10 and 20 of the double are each approximately half as long as the sliding path on the main sliding surface 10 of the Single, making the Double more compact.

A further development of the Double 5 shown in FIG. 1*b* is the Double with a joint shown in FIG. 1C (hereinafter referred to as "Double with joint"), where the slider 3 is formed in two parts 3*a* and 3*b*, which corresponds to a joint. The Double with joint is called "double curved surface slider with articulated slider" 5. Analogous to the double without joint (FIG. 1B), the double with joint (FIG. 1C) has a first sliding plate 1 with a first main sliding surface 10, a second sliding plate 2 with a second main sliding surface 20, a slider 3 and several sliding elements 4.

In contrast to the Double without joint 5, the Double with joint divides the slider 3 into two slider parts 3*a* and 3*b*, whereby the two slider parts 3*a* and 3*b* are in contact with each other via another sliding element 4*a*.

Analogous to the second main sliding surface 20 of the Single, this division serves to ensure optimum contact between the slider 3 or the slider parts 3*a* and 3*b* on the first main sliding surface 10 and on the second main sliding surface 20.

Consequently, the isolation behaviour of a Double with joint is essentially defined by the contact surfaces between the sliding plates 1 and 2 with the corresponding sliding parts 3*a* and 3*b*.

Finally, FIG. 1D shows a further developed sliding pendulum bearing in the form of a so-called "triple friction pendulum" 5 (hereinafter referred to as "Triple").

A Triple has a first sliding plate 1 with a first main sliding surface 10, a second sliding plate 2 with a second main sliding surface 20 as well as a slider 3 and different sliding elements 4. Like the Double with joint, the slider 3 of the Triple also has a first slider part 3*a* and a second slider part 3*b*.

In contrast to the Double with joint, the two slider parts 3*a* and 3*b* of the Triple are not in direct contact with each other, but are coupled via further slider parts 3*c* and 3*d* as well as corresponding sliding elements 4*a*. The two other slider parts 3*c* and 3*d* are coupled via the articulated spherical surface analogous to the articulated slider of the Double with joint.

In the case of the Triple, too, the predominant isolation effect of the sliding pendulum bearing occurs on the main sliding surfaces 10 and 20, so that their dimensioning is based on the dimensioning of the two main sliding surfaces 10 and 20 of the Double with joint.

As already described above with reference to FIG. 1E, the known sliding pendulum bearings described above (Single and Double without joint) all have a non-linear isolation behaviour depending on the peak ground acceleration. This cannot be absorbed by the state-of-the-art development in the form of the Double with joint; the Triple produces an almost linear behaviour in the range of very small to medium peak ground accelerations, but not in the range of medium to maximum peak ground accelerations.

This results in the problem that the corresponding sliding pendulum bearings must be optimized for a certain peak ground acceleration value, but the isolation behavior of the sliding pendulum bearing is comparatively poor at peak ground acceleration values that do not correspond to the value used for optimization. In particular, the coefficient of friction of the sliding pendulum bearing optimized for the design basis earthquake for peak ground acceleration values of the maximum credible earthquake leads on the one hand to a relatively poor isolation effect and on the other hand to relatively large bearing movements, as a result of which the bearing would be large and thus expensive.

SUMMARY OF THE INVENTION

Consequently, it is the object of the present invention to provide a sliding pendulum bearing as well as a method of dimensioning such a sliding pendulum bearing, by means of which lower loads occur during operation on a construction isolated by the sliding pendulum bearing than with conventionally known sliding pendulum bearings.

This objective is solved by a sliding pendulum bearing according to claim 1 and a method of dimensioning according to claim 12. Advantageous further developments of the invention result from the dependent claims 2 to 11 as well as claims 13 to 15.

The sliding pendulum bearing according to the invention is characterized in that the first main sliding surface of the first sliding plate is designed for a first load case and the second main sliding surface of the second sliding plate is designed for a second load case, whereby the first load case differs from the second load case.

The term "load case" here refers in particular to a specific peak ground acceleration value of a corresponding earthquake.

The design of the two main sliding surfaces with regard to their effective radii and coefficients of friction for different load cases ensures that the isolation behaviour of the sliding pendulum bearing for all peak ground accelerations up to the peak ground acceleration value of the maximum credible earthquake is further approximated to the behaviour of the sliding pendulum bearing with optimized viscous damping than would be possible if the entire sliding pendulum bearing were designed for only one specific load case, as is the case for state-of-the-art sliding pendulum bearings. This makes it possible to obtain a considerably improved isolation behaviour even at peak ground acceleration beyond the assumed peak ground acceleration value of the design basis earthquake for the sliding pendulum bearing, without disproportionately increasing the maximum bearing movement.

Advantageously, the first main sliding surface is designed for a first load case with a value for a peak ground acceleration which corresponds at most to the peak ground acceleration value of the maximum credible earthquake and at least to the peak ground acceleration value of the design basis earthquake. This results in a significantly better isolation behaviour of the sliding pendulum bearing in earthquakes with peak ground acceleration values greater than the peak ground acceleration value of the design basis earthquake, which significantly reduces potential damage to the construction at these peak ground acceleration values compared to conventional bearings. Among other things, this saves costs when repairing the construction after an earthquake with a peak ground acceleration value above the peak ground acceleration value of the design basis earthquake.

The second main sliding surface may be designed for a second load case in which the peak ground acceleration values are less than or equal to the peak ground acceleration value of the design basis earthquake. This makes it possible to improve the isolation effect of the sliding pendulum bearing for earthquakes with peak ground acceleration values below the peak ground acceleration value of the design basis earthquake compared to conventional Single or Double. In this way, stresses on a corresponding construction can be mitigated by earthquakes with low peak ground acceleration values. Consequently, the occurrence of fatigue symptoms on the construction caused by earthquakes with low peak ground acceleration values can be significantly reduced or even avoided.

It is also useful if the lower of the friction coefficients of the two main sliding surfaces, in particular and in general the friction coefficient of the second main sliding surface, is so large that a predefined minimum shear resistance of the sliding pendulum bearing is guaranteed. Minimum shear resistance here means that a certain minimum excitation is required in order to cause the sliding pendulum bearing to actuate, i.e. the slider to move along at least one of the two main sliding surfaces of the sliding pendulum bearing. By guaranteeing a pre-defined minimum shear resistance, the wear of the sliding pendulum bearing is also reduced, since not even the slightest excitation of the construction leads to a bearing movement in the sliding pendulum bearing. This is particularly advantageous if the construction isolated by the sliding pendulum bearing is already designed to withstand earthquakes with only small peak ground acceleration values without damage or excessive fatigue.

Practically, the two main sliding surfaces are furthermore matched to each other in their geometry and/or their friction behaviour in such a way that the curve of the resulting absolute construction acceleration as a function of the peak ground acceleration up to the peak ground acceleration value of the maximum credible earthquake has a substantially linear course. By the geometry of the main sliding surfaces is meant, for example, an effective radius of curvature of the main sliding surfaces, while the friction behaviour is determined, for example, by the friction coefficients of the respective main sliding surface. Due to the linearity of the curve of the resulting absolute construction acceleration as a function of the peak ground acceleration, it is possible to approximate the isolation behaviour of the sliding pendulum bearing even further to the isolation behaviour of the sliding pendulum bearing with optimized viscous damping and thus to improve it compared to the conventional known sliding bearings, which exhibit a non-linear curve of the absolute construction acceleration as a function of the peak ground acceleration.

In particular, the geometry and/or friction behaviour of the two main sliding surfaces can be matched to one another in such a way that a curve of the resulting absolute structural acceleration as a function of the peak ground acceleration has a course which is closer to the course of the resulting absolute structural acceleration of a sliding pendulum bearing with optimized viscous damping than that of conventional sliding pendulum bearings. This is shown in particular by the fact that the values for the resulting absolute construction acceleration are on average smaller for peak ground acceleration values up to the peak ground acceleration value of the maximum credible earthquake than those for the conventionally known sliding bearings or are closer to the corresponding value for the sliding pendulum bearing with optimized viscous damping. Thus, the sliding pendulum bearing is ideally closer to the sliding pendulum bearing with optimized viscous damping than conventional sliding pendulum bearings over the entire range of the relevant peak ground acceleration values and thus comes closer to the ideal course of the isolation effect than conventional sliding pendulum bearings.

It is also advantageous if the geometry and/or friction behaviour of the two main sliding surfaces are matched to each other in such a way that in the second load case, i.e. with smaller peak ground accelerations, the sliding path of the slider along the second main sliding surface is considerably greater or approximately the same as the sliding path of the slider along the first main sliding surface, and in the first load case, i.e. with larger to maximum peak ground accelerations, the sliding path of the slider along the first main sliding surface is greater or smaller than along the second main sliding surface. This design makes it possible to separate the effect of the two main sliding surfaces from each other. This also makes it possible, for example, to reduce the displacement capacity and thus the dimensions of the entire sliding pendulum bearing, which reduces the maximum possible isolation effect of the bearing according to the invention somewhat but still leads to a better isolation effect than with a conventional Single or Double. In order to clearly separate the effect of the two main sliding surfaces and to minimize the bearing displacement capacity, a limiting ring can be used on one main sliding surface. It is to be explicitly noted that this limiting ring does not limit the total displacement capacity of the bearing.

It is advantageous if the first main sliding surface has a first effective radius of curvature $R_{eff,1}$ and the second main sliding surface has a second effective radius of curvature $R_{eff,2}$, where the sum of $R_{eff,1}$ and $R_{eff,2}$ is at least 1.4 times the effective radius of curvature of a sliding pendulum bearing with only one curved main sliding surface.

Preferably, the sum $R_{eff,1}$ and $R_{eff,2}$ is in the range of 1.4 to 2.0 times the effective radius of curvature of a sliding pendulum bearing with only one curved main sliding surface.

Also preferred is the sum of $R_{eff,1}$ and $R_{eff,2}$ greater than 2 times the effective radius of curvature of a sliding pendulum bearing with only one curved main sliding surface. Here it is preferred that the displacement capacity of the sliding pendulum bearing is not greater than that of the sliding pendulum bearing with only one curved main sliding surface or that of a sliding pendulum bearing with two identical curved main sliding surfaces of the Double type, the effective radius of curvature of which is approximately 0.2485 times the square of a desired isolation cycle duration $T_{ISO}$ in seconds of the construction to be protected with a sliding pendulum bearing having only one or two identical curved main sliding surfaces (Single or Double type).

Preferably the first main sliding surface has a first effective radius of curvature $R_{eff,1}$ and the second main sliding surface (20) has a second effective radius of curvature $R_{eff,2}$, wherein $R_{eff,1}$ and $R_{eff,2}$ each amount to at least 0.7 times the effective radius of curvature of a sliding pendulum bearing with only one curved main sliding surface.

Further preferably, $R_{eff,1}$ and $R_{eff,2}$ are each greater than 0.7 times the effective radius of curvature of a sliding pendulum bearing having only one curved main sliding surface.

It is particularly advantageous if the first main sliding surface has a first effective radius of curvature $R_{eff,1}$ which is approximately as large as for a sliding pendulum bearing with only one curved main sliding surface and the second main sliding surface has a second effective radius of curvature $R_{eff,2}$, which is in the range from 0.75 to 2 times, and in particular in the range from 0.90 to 1.5 times, the first effective radius of curvature $R_{eff,1}$, and in particular preferably equal to the first effective radius of curvature $R_{eff,1}$. This configuration can be easily achieved starting from a Single by adjusting the radius of curvature of the second main sliding surface, but differs from the configuration of a corresponding Double without joint in that, as already described above, in a Double, the effective radii of curvature of the two main sliding surfaces in the sum correspond just to the effective radius of curvature of the first main sliding surface of the Single and not already the radius of curvature of the first main sliding surface corresponds to the effective radius of curvature of the first main sliding surface of the Single. The design with regard to strength and thus the resulting geometry and manufacture of the sliding bearing according to the invention is considerably simplified, since, for example, two identical sliding plates can be used, which saves considerable costs both during the design of the strength of the sliding bearing and during its manufacture.

It also makes sense if a first effective radius of curvature $R_{eff,1}$ of the first main sliding surface in meters corresponds to about 0.25 times the square of a desired isolation cycle duration $T_{ISO}$ in seconds of the construction to be protected by the sliding pendulum bearing. The isolation cycle duration $T_{ISO}$ is the oscillation cycle of the construction with sliding pendulum bearing. This dimensioning of the first effective radius of curvature $R_{eff,1}$ of the first main sliding surface results in a particularly advantageous isolation effect of the construction due to the first main sliding surface for peak ground accelerations greater than the design basis earthquake.

It makes sense for the first main sliding surface to have a first coefficient of friction $\mu_1$ for the friction with the slider, which is approximately as large as for a sliding pendulum bearing with only one curved main sliding surface, and the second main sliding surface has a second friction coefficient $\mu_2$ for the friction with the slider, which lies in the region of the lubricated friction, and in particular has a value between 0.2% and 2.0%, preferably between 0.4% and 1.5%, and in particular preferably between 0.6% and 1.25%. This advantageous design ensures that the second main sliding surface ensures good isolation characteristics of the sliding pendulum bearing, especially in the event of earth shocks with only small amplitudes.

Also advantageously, the first main sliding surface has a first coefficient of friction $\mu_1$ for the friction with the slider which is approximately as large as for a sliding pendulum bearing having only one curved main sliding surface, and the second main sliding surface has a second coefficient of friction $\mu_2$ which is lower than $\mu_1$ and which is in the range from about 0.2% to 1.7% when the second main sliding surface is lubricated and in the range from about 2% to 3.5% when the second main sliding surface is not lubricated. This ensures a minimum shear resistance.

Advantageously, the second main sliding surface has a limitation means for limiting the displacement capacity of the slider on the second main sliding surface. In particular, the limitation means is designed as an annular abutment. By providing such a limitation means on the second main sliding surface or on the second sliding plate, it is possible to separate the effect of the first main sliding surface for deflection amplitudes above the displacement capacity of the slider on the second main sliding surface from the effect of the second main sliding surface. This allows the displacement capacity of the slider on the second main sliding surface to be limited, particularly in the case of large earthquake excitation forces, in such a way that the structural dimensions of the sliding bearing can be made smaller than if no limitation means were provided.

It is particularly advantageous if the limitation means is designed such that the displacement capacity $D_2$ of the slider on the second main sliding surface is substantially smaller than or equal to the displacement capacity $D_1$ of the slider on the first main sliding surface. Thus, the dimensions of the corresponding sliding pendulum bearing are essentially determined by the displacement capacity of the slider on the first main sliding surface, so that the sliding pendulum bearing can be designed in its dimensions similar to a corresponding Single.

Furthermore, it is particularly preferred if the displacement capacity $D_2$ of the slider on the second main sliding surface is limited to 0.8 times and preferably to 0.5 times the displacement capacity $D_1$ of the slider on the first main sliding surface. This further limitation of the slider's movement capacity on the second main sliding surface makes it possible to avoid excessive total bearing movements, which result from the sum of the bearing movement on the first main sliding surface and the bearing movement on the second main sliding surface, and thus to save installation space and manufacturing costs.

The displacement capacity $D_2$ of the slider on the second main sliding surface is preferably in the range of 1.0 times to 0.25 times, preferably in the range of 1.0 times to 0.7 times the value of $D_1$ of the slider on the first main sliding surface.

Finally, it makes sense if the displacement capacity of the slider on the second main sliding surface is at least 0.1 times, and in particular at least 0.2 times, the displacement capacity of the slider on the first main sliding surface. This minimum requirement for the displacement capacity of the slider on the second main sliding surface ensures that the second main sliding surface can exert its effect at least over a certain range of the deflection and is thus also able to sufficiently influence the isolation behaviour of the entire sliding pendulum bearing.

Finally, the limitation means is preferably designed in such a way that the total displacement capacity of the sliding pendulum bearing is essentially limited to the dimension of the movement capacity of a sliding pendulum bearing with only one main sliding surface. Furthermore, the limitation means is preferably designed such that the total displacement capacity of the sliding pendulum bearing is at most the same size as and preferably smaller than the displacement capacity of a sliding pendulum bearing with only one main sliding surface or as that of a sliding pendulum bearing with two identically curved shaped main sliding surfaces (in the manner of a Double). This ensures that the final sliding pendulum bearing formed is not larger than a corresponding Single and can therefore easily be used to replace, for example, an existing Single type sliding pendulum bearing without further structural adjustments.

Purposefully the slider has two slider parts, which are in surface contact with each other via a curved sliding surface. The first sliding part is in contact with the first main sliding surface while the second sliding part is in contact with the second main sliding surface. This subdivision of the slider into two slider parts and the provision of the subsidiary sliding surface make it possible to ensure that the corresponding sliding surfaces of the slider are in contact with the two main sliding surfaces independently of the movements on the two main sliding surfaces, thus decoupling the movements along the two main sliding surfaces. Together with the slider parts, the slider thus represents a joint that is preferably capable of decoupling the sliding paths on the two sliding surfaces or sliding plates. A particularly preferred embodiment of this sliding pendulum bearing has different sliding paths, different coefficients of friction and different effective radii on the two main sliding surfaces.

It is particularly advantageous if the friction properties of the subsidiary sliding surface of the slider are such that a third coefficient of friction $\mu_3$ between the two slider parts is as small as possible, which is preferably substantially smaller than the first coefficient of friction $\mu_1$, and in particular has a value of less than approx. 2.0% (upper value of the lubricated friction for $\mu_2$), preferably a value of less than 1.5%, and particularly preferably a value in the range from 0.6% to 1.25%. This special selection of the friction coefficient of the subsidiary sliding surface of the slider ensures that the subsidiary sliding surface provides the necessary rotation of the sliding pendulum bearing without influencing the isolation behaviour of the sliding pendulum bearing.

Last but not least, it is advisable if the radii of curvature and friction properties of the main sliding surfaces of the sliding pendulum bearing are set so that the sliding pendulum bearing has a back centering error of max. 30%, in particular of max. 20% and especially preferred of max. 10%. This ensures that the isolation effect of the sliding pendulum bearing will exhibit similar isolation characteristics to that of the sliding pendulum bearing even after a previous actuation of the sliding pendulum bearing. This ensures that the sliding pendulum bearing has a largely similar isolation effect over several actuations and that previous actuations of the sliding pendulum bearing do not negatively influence the isolation behaviour of the sliding pendulum bearing beyond an acceptable level.

A method according to the invention for dimensioning a corresponding sliding pendulum bearing is characterized in that a first main sliding surface of the first sliding plate is designed for a first load case and a second main sliding surface of the second sliding plate is designed for a second load case which differs from the first load case. The resulting sliding pendulum bearing has the advantage over the conventional sliding pendulum bearings that its isolation behavior is improved not only for the peak ground acceleration values of the design basis earthquake but also for peak ground acceleration values beyond this peak ground acceleration value.

Advantageously, the slider has two slider parts which are in surface contact with each other via a curved subsidiary sliding surface, wherein the first slider part is in contact with the first main sliding surface and the second slider part is in contact with the second main sliding surface. This so formed joint is preferably able to decouple the sliding paths at the two sliding surfaces or sliding plates. A particularly preferred embodiment of the dimensioning method leads to a sliding pendulum bearing with different sliding paths, different coefficients of friction and different effective radii on the two main sliding surfaces.

It is advantageous that the first main sliding surface is designed for a load case with a value for peak ground acceleration that corresponds at most to the peak ground acceleration value of the maximum credible earthquake and at least to the peak ground acceleration value of the design basis earthquake. This ensures that even in the case of earthquakes with peak ground acceleration values between the corresponding values for the design basis earthquake and the maximum credible earthquake, the correspondingly designed sliding pendulum bearing exhibits improved isolation behaviour and can therefore largely suppress loads caused by such earthquakes on a envisaged construction.

It makes sense to design the second main sliding surface for a second load case with a value for the peak ground acceleration which is less than or equal to the peak ground acceleration value of the design basis earthquake. This makes it possible, among other things, to suppress damage caused by repeated earthquakes with only small peak ground acceleration values, which can finally occur in particular in the form of fatigue phenomena.

Furthermore, at least the lower coefficient of friction of one of the two main sliding surfaces, in particular the coefficient of friction of the second main sliding surface, can be selected such that a predefined minimum shear resistance of the sliding pendulum bearing is ensured. This makes it possible to avoid actuation of the sliding pendulum bearing in the event of a weak earthquake and thus to avoid excessive wear of the sliding pendulum bearing. As already described above, this appears to be particularly advantageous if the corresponding construction is already designed to withstand such weak earthquakes without major damage and the sliding pendulum bearing is intended primarily to protect against earthquakes with significantly greater excitations. This can also significantly reduce maintenance costs for the sliding pendulum bearing.

Furthermore, it makes sense if the geometry and/or friction behaviour of the two main sliding surfaces are matched in such a way that the curve of the resulting absolute construction acceleration as a function of the peak ground acceleration has a substantially linear course up to the peak ground acceleration value of the maximum credible earthquake. A linear course of the resulting absolute construction acceleration compared to the peak ground acceleration comes close to the course of the resulting absolute construction acceleration as a function of the peak ground acceleration of the sliding pendulum bearing with optimized viscous damping and thus the ideal course. Thus the behaviour of the designed sliding pendulum bearing can be easily estimated on the one hand and on the other hand optimised to the ideal course of the sliding pendulum bearing with optimized viscous damping.

It is advantageous that the geometry and/or friction behaviour of the two main sliding surfaces are matched to each other in such a way that a curve of the resulting absolute structural acceleration as a function of the peak ground acceleration shows a curve which is closer to the curve of the resulting absolute structural acceleration of a sliding pendulum bearing with optimized viscous damping than that of conventional sliding pendulum bearings. Such a dimensioned sliding pendulum bearing comes closer in its isolation behavior to the ideal isolation behavior of the sliding pendulum bearing with optimal viscous damping than conventional known bearings and thus exhibits in particular an overall improved isolation behavior over the relevant peak ground accelerations.

Furthermore, it makes sense if the geometry and/or friction behaviour of the two main sliding surfaces are matched in such a way that the sliding path of the slider along the second main sliding surface is significantly greater or approximately the same as that along the first main sliding surface in the case of the second load case, i.e. smaller peak ground acceleration values, and that the sliding path of the slider along the first main sliding surface is greater or smaller than that along the second main sliding surface in the case of the first load case, i.e. larger peak ground acceleration values. As already indicated above, the isolation effect of the first main sliding surface can thus be decoupled from the effect of the second main sliding surface, especially in the case of large earthquake excitation forces, in order to be able to better adapt the overall isolation behavior of the sliding pendulum bearing and also to reduce the required installation space for the sliding pendulum bearing.

Advantageously, in a first step of the dimensioning method, a first effective radius of curvature $R_{eff,1}$ and a first friction value $\mu_1$ are determined for the first main sliding surface (10) under the assumption that the sliding pendulum bearing (5) has only one single main sliding surface, and a second effective radius of curvature $R_{eff,2}$ is selected for the second main sliding surface (20), which second effective radius of curvature $R_{eff,2}$ is selected in the range from 0.75 to 2 times, preferably in the range from 0.75 to 1.5 times the radius of curvature of the first main sliding surface (10), and a second coefficient of friction $\mu_2$ is selected for the second main sliding surface (20), which second coefficient of friction $\mu_2$ is selected between 0.2% and 2.0%, preferably between 0.4% and 1.5% and more preferably between 0.6% and 1.25% (in the region of the lubricated friction), or which is less than or equal to the first effective coefficient of friction $\mu_1$, in order to ensure a predefined minimum shear resistance. The second coefficient of friction $\mu_2$ can be at least 0.75 times smaller than the first coefficient of friction $\mu_1$ or only smaller than or equal to the first coefficient of friction $\mu_1$, thereby ensuring a predefined minimum shear resistance. This makes it possible to obtain a sliding pendulum bearing that exhibits improved isolation behavior compared to conventional sliding pendulum bearings even at peak ground acceleration values below the peak ground acceleration value of the design basis earthquake.

Preferably a second effective radius of curvature $R_{eff,2}$ is selected for the second main sliding surface, which is substantially equal to the first effective radius of curvature $R_{eff,1}$.

Preferably at least 0.7 times the effective radius of curvature of the assumed sliding pendulum bearing with only one curved main sliding surface is selected for $R_{eff,1}$ and $R_{eff,2}$.

Preferably, $R_{eff,1}$ and $R_{eff,2}$ are each selected to be larger than 0.7 times the effective radius of curvature of the assumed sliding pendulum bearing with only one curved main sliding surface.

A second coefficient of friction $\mu_2$ is preferably selected for the second main sliding surface, which coefficient of friction $\mu_2$ is between 0.2% and 2.0%, preferably between 0.4% and 1.5% and further preferably between 0.6% and 1.25% in the case of a lubricated second main sliding surface, and is applied in such a way in the case of a non-lubricated second main sliding surface that a predefined minimum shear resistance is ensured, wherein the coefficient of friction $\mu_2$ is smaller than the coefficient of friction $\mu_1$.

Further to this, in a second step of the dimensioning method by means of non-linear dynamic simulation of the construction with sliding pendulum bearing, taking into account both main sliding surfaces, for at least one peak ground acceleration value, but in particular for all expected peak ground acceleration values from very small values up to the peak ground acceleration value of the maximum credible earthquake, the friction properties of the first main sliding surface and the geometrical properties of the second main sliding surface can be matched to one another in such a way that a behaviour of the maximum absolute construction acceleration and/or the maximum bearing movement, which behavior is as proportional as possible to the course of the peak ground acceleration, is obtained with smaller values than before the matching of the main sliding surfaces to one another. Thus, the isolation behaviour of the sliding pendulum bearing obtained from the first step of the design procedure can be further trimmed to the optimum behaviour of the sliding pendulum bearing with optimized viscous damping.

The following rules should preferably be observed in the dimensioning method: $\mu_2$ is smaller than $\mu_1$ and $D_2$ is smaller than or equal to $D_1$.

It is particularly advantageous if the first effective radius of curvature $R_{eff,1}$ and the second coefficient of friction $\mu_2$ are kept constant during the second step of the design procedure. This makes it possible, on the one hand, to facilitate the matching of the two main sliding surfaces to each other by limiting the adjustable parameters and, on the other hand, to ensure that the sliding pendulum bearing does not have to be completely redesigned and therefore no longer meets the conditions specified at the beginning.

In a third step of the dimensioning method, a maximum required displacement capacity $D_1$ of the slider on the first main sliding surface of the sliding pendulum bearing determined as optimal in the second step is determined and specified for the design of the sliding pendulum bearing. Finally, this step restricts the required installation space of the sliding pendulum bearing in relation to the first main sliding surface, which is advantageous for checking the dimensioning of the designed sliding pendulum bearing and adjusting it if necessary.

It is also advantageous if in the second step of the design procedure for the second friction coefficient $\mu_2$ a value typical for lubricated friction is assumed, in particular a value between 0.2% and 2%, preferably a value between 0.2% and 1.7%, preferably a value between 0.4% and 1.5% and especially preferably a value between 0.5% and 1.0%. This specification ensures that the corresponding sliding pendulum bearing can guarantee sufficient isolation, especially in the case of small earthquakes with low peak ground acceleration. This serves above all to protect the building from fatigue or damage caused by weak but frequently occurring earthquake stimuli.

Advantageously, in a fourth step of the dimensioning method, a second displacement capacity $D_2$ of the slider on the second main sliding surface is set to a value less than or equal to the value of the first displacement capacity $D_1$ of the slider on the first main sliding surface. This makes it possible to limit the dimensions of the sliding pendulum bearing by the dimensions of the first main sliding surface and thus ensure effective use of the available installation space.

Finally, it is advantageous if, in the first step of the dimensioning method, the first effective radius of curvature of the $R_{eff,1}$ and the first coefficient of friction $\mu_1$ are determined using the linear response spectrum method according to DIN EN 15129:2010. On the one hand, this has the advantage that this determination procedure is already known and well tested, which means that no new determination procedures have to be developed. In addition, this at least partially ensures the comparability of the designed sliding pendulum bearing with other sliding pendulum bearings designed in accordance with the standard.

BRIEF DESCRIPTION OF THE DRAWINGS

In the following, advantageous embodiments of the present invention are described using figures. Therein.

FIG. 1D shows schematically a first prior art design of a sliding pendulum bearing;

FIG. 1E shows schematically a diagram in which the course of the maximum absolute acceleration occurring in the construction is shown as a function of the peak ground acceleration (PGA) of a sliding pendulum bearing designed according to the prior art;

DETAILED DESCRIPTION

Figure 1A:
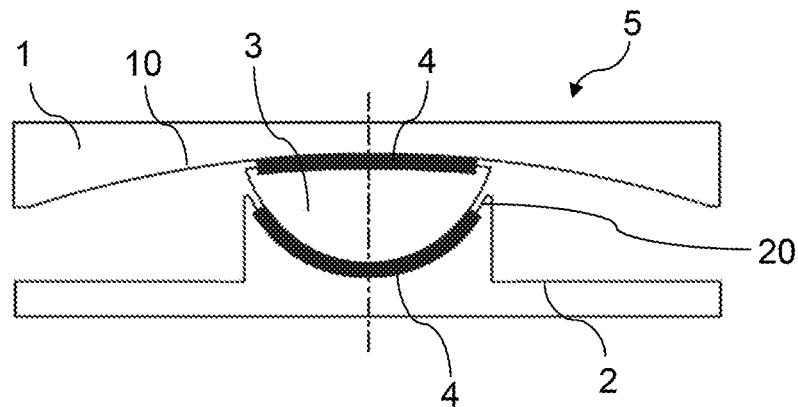
FIG. 1A shows schematically a first prior art design of a sliding pendulum bearing.
Figure 1B:
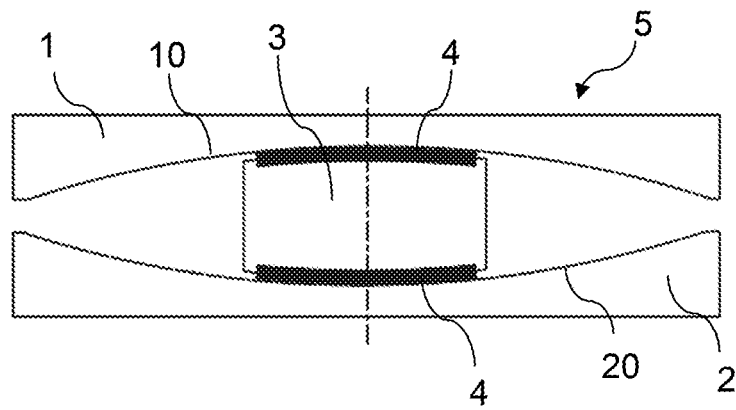
FIG. 1B shows schematically a second prior art design of a sliding pendulum bearing.
Figure 1C:
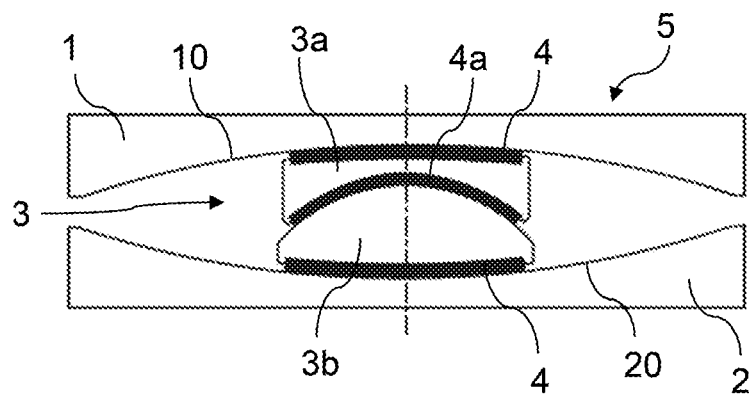
FIG. 1C shows schematically a third prior art design of a sliding pendulum bearing.
Figure 2:
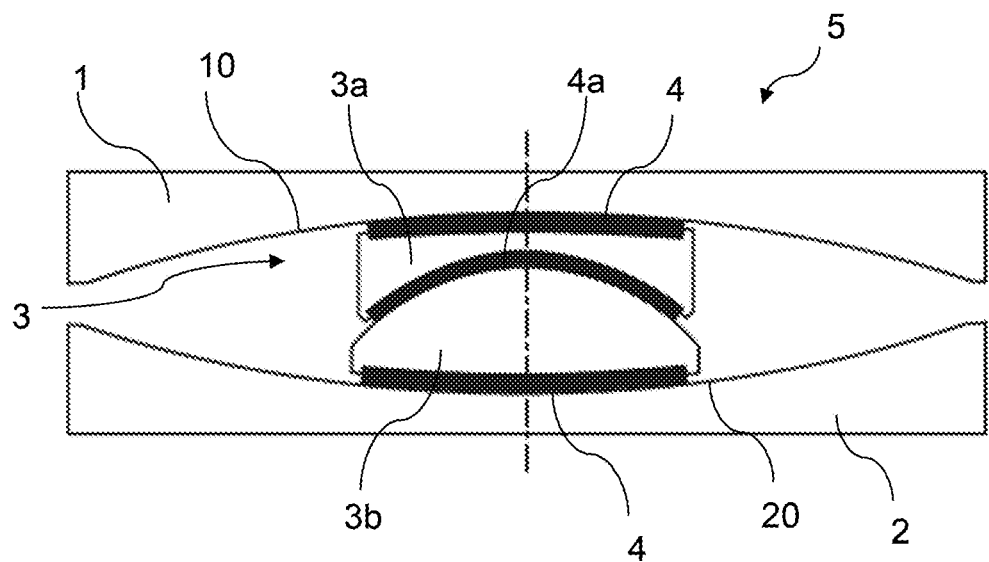
FIG. 2 shows schematically the design of a sliding pendulum bearing corresponding to a first advantageous embodiment of the sliding pendulum bearing according to the invention.
Figure 3:
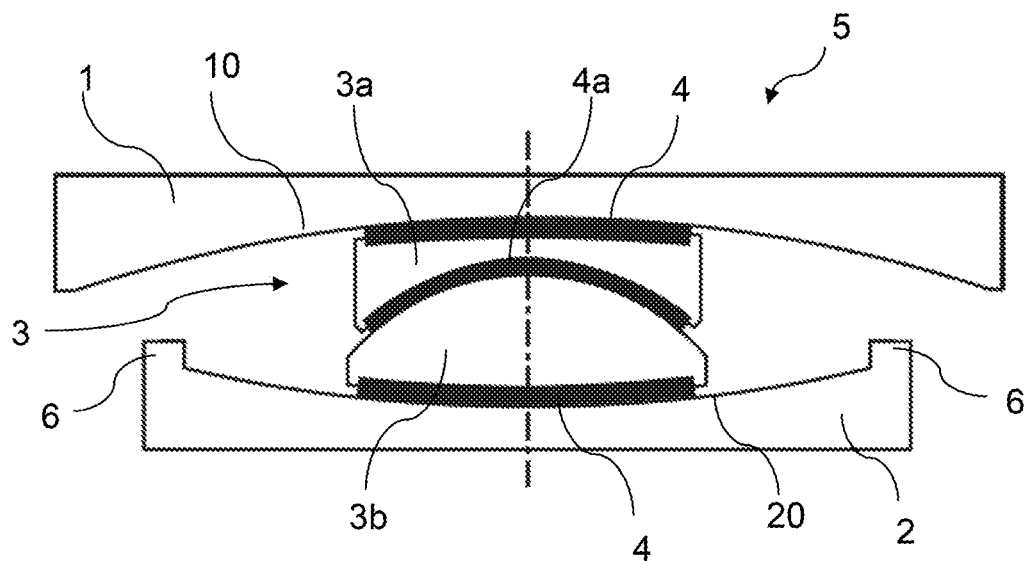
FIG. 3 shows schematically the design of a sliding pendulum bearing corresponding to a second advantageous embodiment of the sliding pendulum bearing according to the invention.

FIGS. 2 and 3 show the schematic structure of a sliding pendulum bearing 5 corresponding to a particularly advantageous embodiment of this invention. Similar to the double with joint described above with reference to FIG. 1C, the sliding pendulum bearings 5 shown comprise a first sliding plate 1 with a first main sliding surface 10, a second sliding plate 2 with a second main sliding surface 20, a slider 3 divided into two slider parts 3a and 3b and various sliding elements 4 and 4*a*. The first slider part 3*a* is in surface contact with the first main sliding surface 10 of the first sliding plate 1 via a sliding element 4, while the second slider part 3*b* is in surface contact with the second main sliding surface 20 of the second sliding plate 2 via another sliding element 4. The two slider parts 3*a* and 3*b* are in surface contact with each other via the sliding element 4*a*. The only difference between the design example shown in FIG. 3 and the design example shown in FIG. 2 is that the sliding pendulum bearing 5 shown in FIG. 3 has a limitation means 6 on the second sliding plate 2, which limits the displacement capacity of the slider 3 on the second main sliding surface 20 and is designed here in particular as a limiting ring.

At this point, it should be made clear that limitation means 6 is particularly advantageous for certain load cases, but is not necessarily necessary for the formation of a sliding pendulum bearing in accordance with the present invention. It must also be made clear that the limitation means 6 does not limit the total displacement capacity of the bearing, since the limitation means 6 limits the maximum movement at one of the two main sliding surfaces to a maximum.

As already described above, the sum of the effective radii of curvature of its main sliding surfaces 10 and 20 corresponds to the effective radius of curvature of the first main sliding surface 10 of a Double type sliding pendulum bearing with joint. Furthermore, the coefficients of friction of the two main sliding surfaces 10 and 20 of the Double with Hinge are identical to each other. This means that both main sliding surfaces 10 and 20 of the double with joint are structurally identical and thus both main sliding surfaces 10 and 20 are designed for the same load case. This serves to evenly divide a bearing movement occurring in the sliding pendulum bearing between the two main sliding surfaces 10 and 20, which results in approximately half of the horizontal installation space required by a single.

In contrast, the sliding pendulum bearings 5 shown in FIGS. 2 and 3 have the main sliding surfaces 10 and 20 designed for two different load cases. This means that, in contrast to the double with joint, the two main sliding surfaces 10 and 20 differ from each other at least in terms of their radius of curvature and/or their coefficient of friction.

In the exemplary embodiments shown in FIG. 2 and FIG. 3, the radii of curvature and the coefficients of friction of the first main sliding surfaces 10 essentially correspond to the radius of curvature and the coefficient of friction of the first main sliding surface 10 of a corresponding single 5. Thus, the radius of curvature of the respective first main sliding surface is almost twice as large as that of a corresponding double with joint. Furthermore, the respective second main sliding surface 20 of the shown advantageous exemplary embodiments form 5 has an effective radius of curvature which essentially corresponds to the effective radius of curvature of the first main sliding surface 10 and is thus twice as large as the radius of curvature of the second main sliding surface 20 of a corresponding double with joint. The coefficient of friction of the respective second main sliding surface 20 is also considerably smaller than the coefficient of friction of the respective first main sliding surface 10 and lies in the range of the lubricated friction, i.e. in the range from 0.2% to 2%, here for example at 1.0%.

Consequently, the sliding pendulum bearings 5 depicted in FIGS. 2 and 3 differ from a corresponding double with joint known from the state of the art in particular with regard to the values of the radii of curvature of the respective first main sliding surface 10 and the respective second main sliding surface 20 as well as with respect to the coefficient of friction of the respective second main sliding surface 20.

The respective first main sliding surface 10 is designed for the peak ground acceleration value of the design basis earthquake, while the respective second main sliding surface 20 is designed for a peak ground acceleration value which is lower than that of the design basis earthquake.

If one of the sliding pin bearings 5 schematically shown in FIGS. 2 and 3 is now excited, the slider 3 will first move along the respective second main sliding surface 20 over the second sliding plate 2 (e.g. to the left), while essentially maintaining its position relative to the respective first sliding plate 1.

With the sliding pendulum bearing 5 with limitation means 6 on the main sliding surface 20, approximately the following happens (see FIG. 3): As soon as the slider 3 reaches the limitation means 6, the slider cannot move further in this direction (i.e. to the left) along the glide plate 2, so that, with sufficient excitation strength, a movement of the slider 3 is now carried out along the first main glide surface 10 of the first sliding plate 1 until the reversal point of the excitation is reached. As soon as the reversal point of the excitation is reached and the excitation is reversed in the opposite direction, the slider 3 is first moved along the second main sliding surface 20 of the sliding plate 2 (to the right) up to the other side of the limitation means 6. As soon as the slider 3 has reached the limitation means 6 again, its movement is no longer possible in relation to the second sliding plate 2. From then on the remaining excitation is intercepted by a movement of the slider 3 along the first main sliding surface 10 of the first sliding plate 1. This play is repeated until no more excitation takes place and the slider aligns itself advantageously again in or as close as possible to the respective centre of the two sliding plates 2 and 1.

With the sliding pendulum bearing 5 without limitation means on the main sliding surface 20, approximately the following happens (see FIG. 2): The slider will also move relative to the second main sliding surface 20 as soon as the friction force on the second main sliding surface 20 is equal to the dead force of the first main sliding surface 10, which is the sum of the friction force on the second main sliding surface 20 and the slope driven force from the curvature of the main sliding surface 20. This state of motion can also occur with the sliding pendulum bearing 5 with limiting ring, depending on the design of the effective radii and coefficients of friction of the two main sliding surfaces 10 and 20. In this case, the slider will only arrive at the limitation means of the main sliding surface 20 at a later point in time. The main difference between the sliding pendulum bearing 5 with limitation means and the sliding pendulum bearing 5 without limitation means is that the former leads to a somewhat smaller maximum bearing movement at the maximum credible earthquake than the latter, but the isolation of the former is slightly less good than that of the latter, but still considerably better than that of the conventional sliding pendulum bearing type Single or Double.

Contrary to the bearing movement of the bearing according to the invention, which is limited mainly to one of the two sliding plates, the conventional double with joint distributes any bearing movement occurring uniformly throughout the two main sliding surfaces 10 and 20. This leads to a poorer isolation behaviour for most of the possible peak ground accelerations of the possible earthquakes. The design of the main sliding surfaces 10 and 20 for different load cases ensures that the corresponding sliding pendulum bearing 5 is not only designed for a peak ground acceleration value, but for a large range of possible peak ground acceleration values, and thus exhibits an overall isolation behavior that is closer to the sliding pendulum bearing with optimized viscous damping and consequently better over a large range of possible peak ground acceleration values.

In the following, two examples of dimensioning methods for corresponding sliding pendulum bearings are presented and the resulting sliding pendulum bearing is compared with a corresponding conventional sliding pendulum bearing of the type Single.

First, a design of the parameters of the sliding pendulum bearing based on the design of a corresponding single is carried out. The radius of curvature $R_{\mathit{eff},1}$ of the first main sliding surface is calculated from the intended isolation cycle duration $T_{ISO}$ according to the formula $$R_{\mathit{eff},1} = g \times (T_{ISO}/2\pi)^2$$

The radius obtained from this corresponds to the radius of the first main sliding surface of a corresponding single.

The coefficient of friction $\mu_1$ for the first main sliding surface with the radius $R_{\mathit{eff},1}$ is then determined under the assumption of a single for the peak ground acceleration value of the assumed design basis earthquake by means of dynamic simulation with optimization to minimum absolute construction acceleration. Alternatively, the coefficient of friction $\mu_1$ for the first main sliding surface could also be determined using the linear method of the response spectrum. Now the radius $R_{\mathit{eff},2}$ of the second main sliding surface is selected equal to the radius $R_{\mathit{eff},1}$ of the first main sliding surface and the coefficient of friction $\mu_2$ of the second main sliding surface is set with a value typical for lubricated friction. Furthermore, the maximum movement capacity of the slider on the two main sliding surfaces is calculated for the maximum credible earthquake.

These steps serve a rough design of the parameters of the sliding pendulum bearing and are identical for the two examples of the design method described here according to the invention.

For this first design of the main sliding surface of the sliding pendulum bearing, the corresponding values for a sliding pendulum bearing of type Single are used.

In the examples shown here, it is assumed that the peak ground acceleration value of the design basis earthquake is 4 m/s² and the peak ground acceleration value of the maximum credible earthquake is 6 m/s², i.e. 150% of the peak ground acceleration value of the design basis earthquake. Furthermore, an isolation cycle duration of 3.5 seconds should be maintained. The optimization of the coefficient of friction $\mu_1$ of the first main slip surface 10 for a minimum absolute construction acceleration of 4 m/s² at the peak ground acceleration results in a coefficient of friction of 3.0% in the present example. The movement capacity of d=0.3 m required for the first main sliding surface 10 can be estimated from the movement capacity of the Single type for the peak ground acceleration value of the maximum credible earthquake.

After the first rough design of the sliding pendulum bearing, the intended main sliding surfaces must be matched to each other in such a way that the sliding pendulum bearing meets certain boundary conditions. For the first example, the aim is to achieve an almost linear isolation behavior with minimum absolute construction accelerations.

Starting from the first design, the second effective radius of curvature $R_{\mathit{eff},2}$ is first set equal to the first effective radius of curvature $R_{\mathit{eff},1}$ and the second coefficient of friction $\mu_2$ is set to a value of lubricated friction in the range from 0.2% to 2% and in this example to 0.75%.

After this first design, the coefficient of friction $\mu_1$ of the first main sliding surface, the effective radius $R_{\mathit{eff},2}$ of the second main sliding surface and the movement capacity of the slider on the second main sliding surface $D_2$ are varied until, over the entire range of the relevant peak board acceleration values, at least on average, the smallest possible absolute construction acceleration is achieved and the isolation behaviour is as linear as possible. Finally, the required movement capacity $D_1$ of the slider on the first main sliding surface is determined, which results in particular from the peak ground acceleration value of the maximum credible earthquake.

In the present example, this optimization shows that the coefficient of friction $\mu_1$ of the first main sliding surface is 3.5%, the two radii of curvature $R_{\mathit{eff},1}$ and $R_{\mathit{eff},2}$ of the two main sliding surfaces are identical and correspond to the radius of curvature of the corresponding single, the coefficient of friction $\mu_2$ of the second main sliding surface is 0.85% and the necessary movement capacity of the slider on the second main sliding surface $D_2$ is 0.130 m. The limitation of the slider's movement capacity on the second main sliding surface is achieved structurally by a limitation means provided in the sliding pendulum bearing.

FIGS. 4A to 4D finally show diagrams in which the behavior of the sliding pendulum bearing designed according to the design method described above is compared to the behavior of a corresponding single and a corresponding sliding pendulum bearing with optimized viscous damping.

Figure 4A:
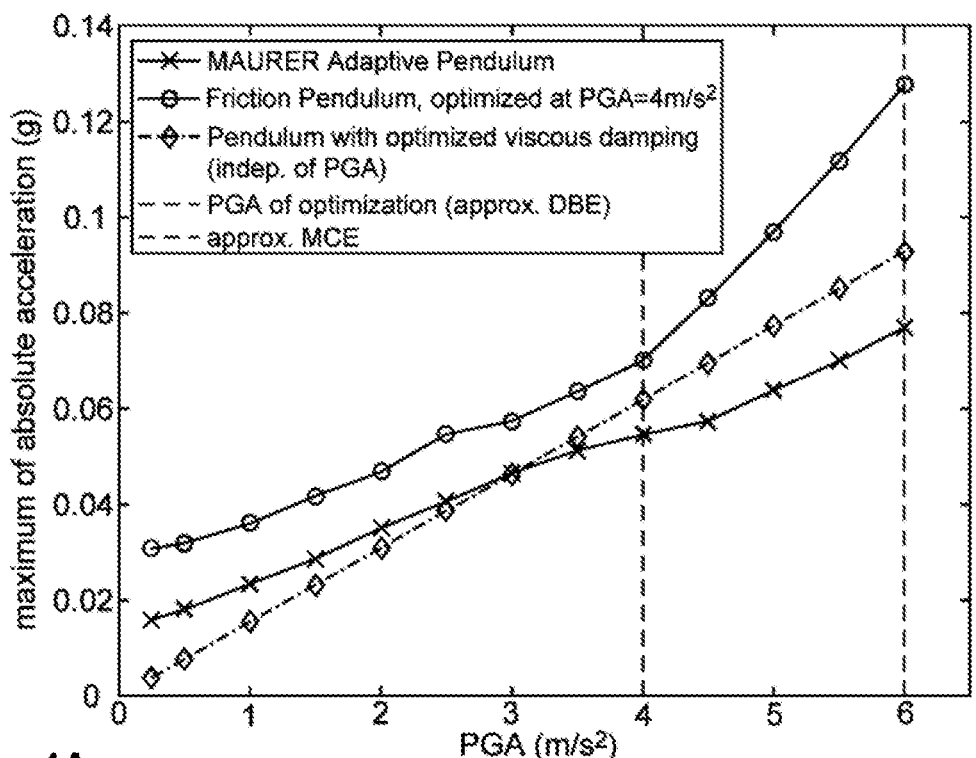
FIG. 4A shows schematically a diagram in which the course of the maximum absolute acceleration occurring in the construction is shown as a function of the peak ground acceleration (PGA) of a sliding pendulum bearing designed according to a first embodiment of the dimensioning method (cf. curve for "MAURER Adaptive Pendulum") in comparison to already known comparable bearings (cf. curves for "Friction Pendulum" and "Pendulum with optimized viscous damping")

FIG. 4A shows the absolute construction acceleration as a function of the peak ground acceleration (PGA). When comparing the corresponding curves with each other, it can be seen that the sliding pendulum bearing obtained according to the design method described above (cf. curve for "Maurer Adaptive Pendulum") has an almost linear curve of the absolute construction acceleration as a function of the peak ground acceleration. Furthermore, the corresponding values for the absolute structural acceleration are clearly below the respective values of the corresponding Single type sliding pendulum bearing (see curve for "Friction Pendulum"). In addition, it can be seen that the values obtained for the absolute construction acceleration for the sliding pendulum bearing designed according to the embodiment are on average much closer to the values of the sliding pendulum bearing with optimized viscous damping (cf. curve to "Pendulum with optimized viscous damping") than the respective values for the corresponding single. Consequently, the sliding pendulum bearing dimensioned according to the embodiment of the present invention has a better isolation behaviour than a corresponding single, so that stresses on the construction can be better suppressed by the sliding pendulum bearing dimensioned according to the invention.

Figure 4B:
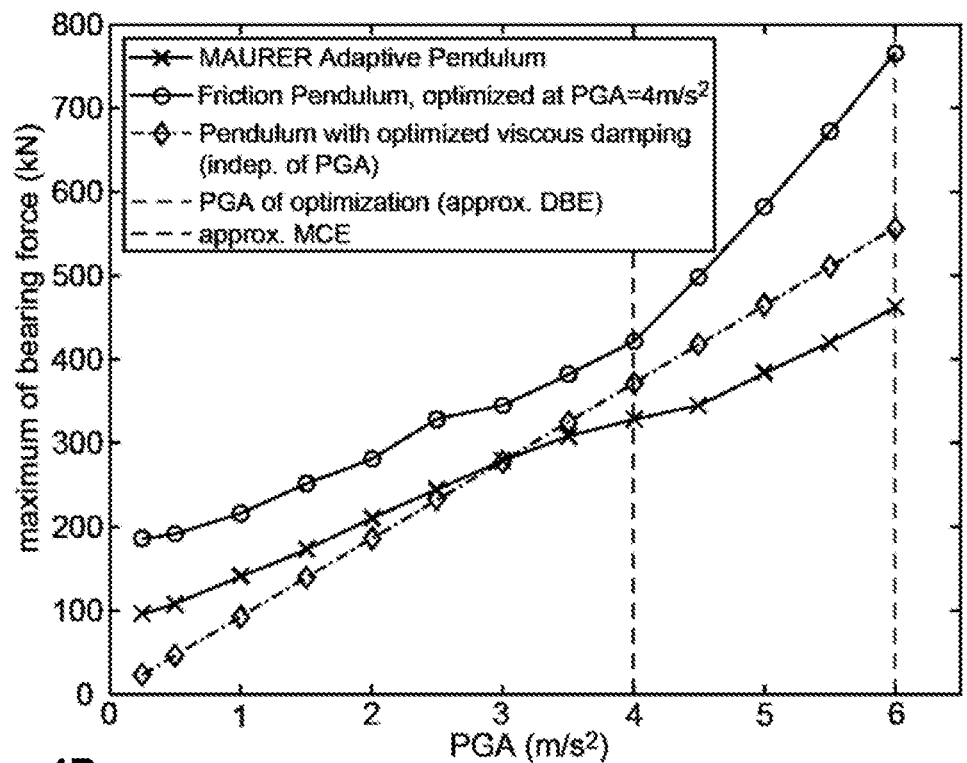
FIG. 4B shows schematically a diagram in which the course of the maximum horizontal bearing force ("maximum of bearing force") as a function of the peak ground acceleration ("PGA") of a sliding pendulum bearing designed according to the first embodiment of the dimensioning method (cf. curve for "MAURER Adaptive Pendulum") in comparison to already known comparable bearings (cf. curves for "Friction Pendulum" and "Pendulum with optimized viscous damping")

FIG. 4B shows the maximum horizontal bearing force occurring for the corresponding bearings as a function of the peak ground acceleration. The corresponding curves closely resemble the corresponding curves shown in FIG. 3A, so that the findings obtained above with reference to FIG. 3A can essentially also be transferred to the maximum horizontal bearing forces.

Figure 4C:
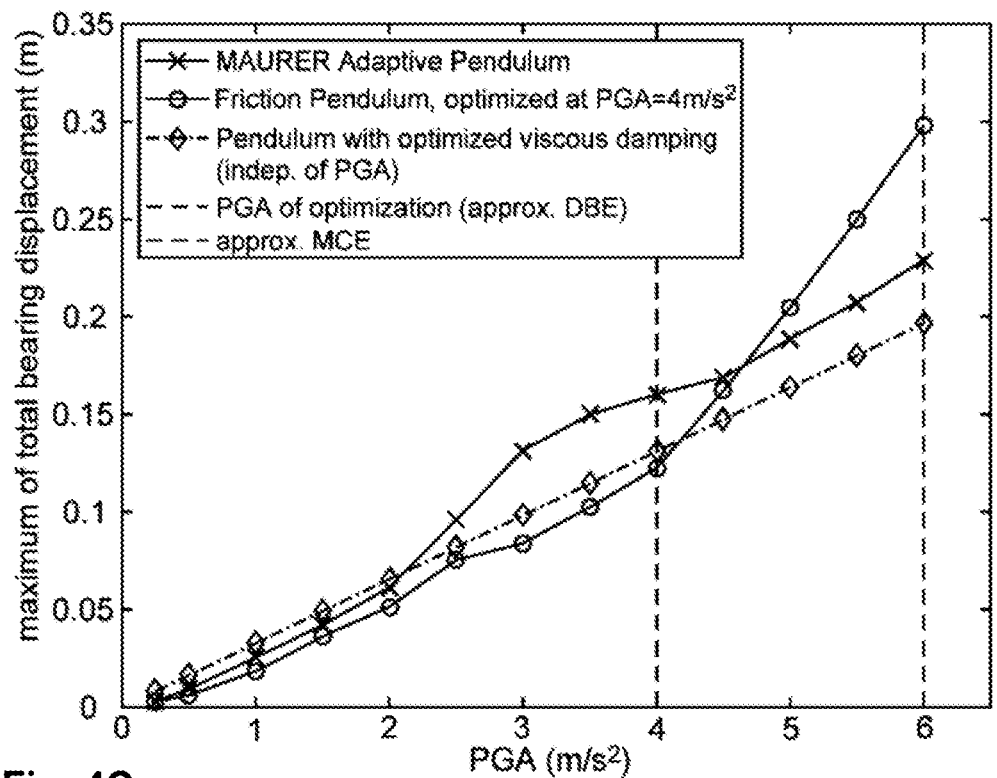
FIG. 4C shows schematically a diagram in which the course of the maximum total bearing displacement as a function of the peak ground acceleration ("PGA") of a sliding pendulum bearing designed according to the first embodiment of the dimensioning method (cf. curve for "MAURER Adaptive Pendulum") in comparison to already known comparable bearings (cf. curves for "Friction Pendulum" and "Pendulum with optimized viscous damping")

The diagram in FIG. 4C shows the maximum bearing movement as a function of the peak bearing acceleration value for the corresponding bearings. It can be seen that the maximum bearing movement due to the maximum credible earthquake for the bearing designed according to the invention is considerably smaller than the value of the conventional sliding pendulum bearing of type Single or Double.

Figure 4D:
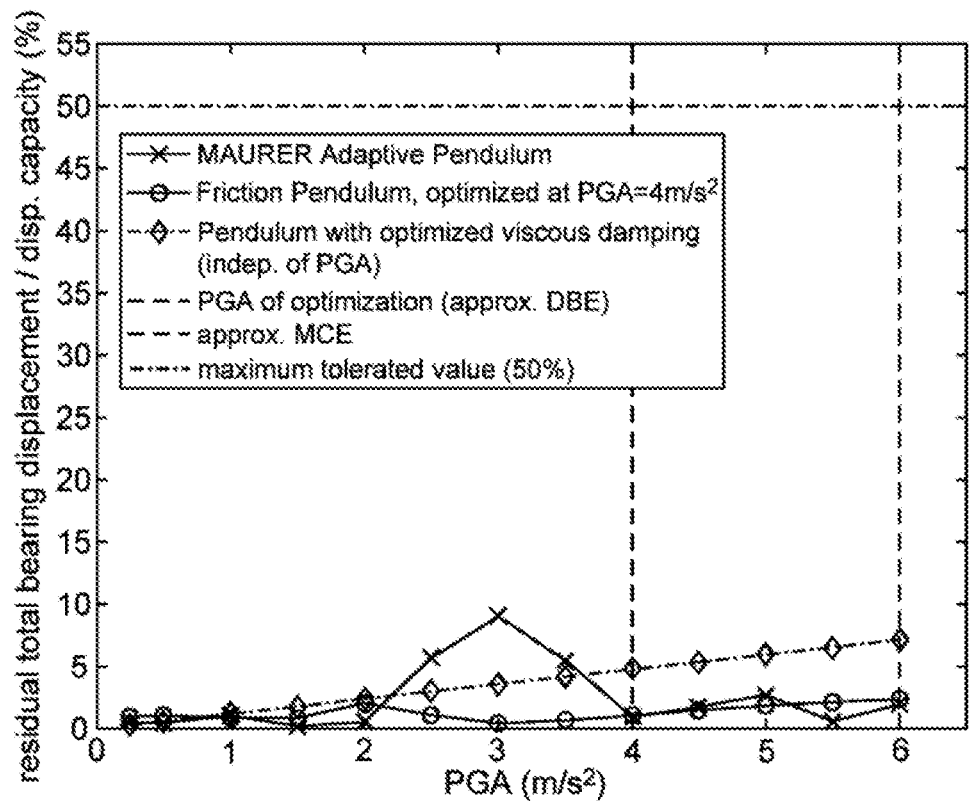
FIG. 4D shows schematically a diagram in which the course of the residual total bearing displacement as a function of the peak ground acceleration ("PGA") of a sliding pendulum bearing dimensioned in accordance with the first embodiment of the dimensioning method (cf. curve for "MAURER Adaptive Pendulum") in comparison with already known comparable bearings (cf. curves for "Friction Pendulum" and "Pendulum with optimized viscous damping")

FIG. 4D shows the back centering error for the bearings described above as a function of the peak ground acceleration. From the diagram it can be seen that for the correspondingly designed sliding pendulum bearing, a back centering error of slightly more than 10% results, especially for the value for the peak ground acceleration of 3 m/s². Thus, for this peak ground acceleration value, the back centering error of the sliding pendulum bearing dimensioned according to the present embodiment of the invention is higher than for the corresponding single or for the sliding pendulum bearing with optimized viscous damping. However, the back centering error does not exceed the limit of 50% and is even far below this limit value. This increased back centering error is more than compensated by the above described optimized behaviour of the sliding pendulum bearing designed according to the present embodiment with respect to the maximum absolute construction acceleration, the maximum bearing force and the maximum bearing movement and is far below the limit value of 50%, which means that the comparatively insignificant deterioration is gladly accepted here.

For the second design example of the dimensioning method according to the invention, the aim is not to obtain any bearing movement at low loads and to obtain an approximate linear behaviour with minimum absolute structural acceleration for loads with higher peak ground acceleration values.

Starting from the first design of the sliding pendulum bearing described above on the basis of the values resulting for a corresponding sliding pendulum bearing of type Singles, the second effective radius of curvature $R_{eff,2}$ is set equal to the first effective radius of curvature $R_{eff,1}$ and the second coefficient of friction $\mu_2$ is set to the value 3.0% in order to guarantee the required minimum shear resistance of 3% of the vertical load on the bearing (identical to 3% of the absolute acceleration in g).

In the course of a coordination of the properties of the two main sliding surfaces, the two coefficients of friction $\mu_1$ and $\mu_2$, the radius of curvature $R_{eff,2}$ of the second main sliding surface and the movement capacity of the slider on the second main sliding surface are then designed under the boundary conditions that the sliding pendulum bearing is not to be triggered up to a certain excitation and that the sliding pendulum bearing is to produce an approximately linear behaviour of the absolute construction acceleration as a function of the peak ground acceleration. This optimization is also carried out by dynamic simulation of the construction with sliding pendulum bearings.

In the present case, the results of the optimization show that the coefficient of friction $\mu_1$ of the first main sliding surface and the coefficient of friction $\mu_2$ of the second main sliding surface must be 3.0%, while the effective radii of the first main sliding surface and the second main sliding surface $R_{eff,1}$ and $R_{eff,2}$ are both equal to the effective radius of the corresponding single. A limitation of the slider's movement capacity on the second main glide surface is not necessary.

Analogous to FIGS. 4A to 4D, FIGS. 5A to 5D show the maximum absolute construction acceleration, the maximum bearing force, the maximum bearing movement and the back centering error as a function of the peak ground acceleration.

Figure 5A:
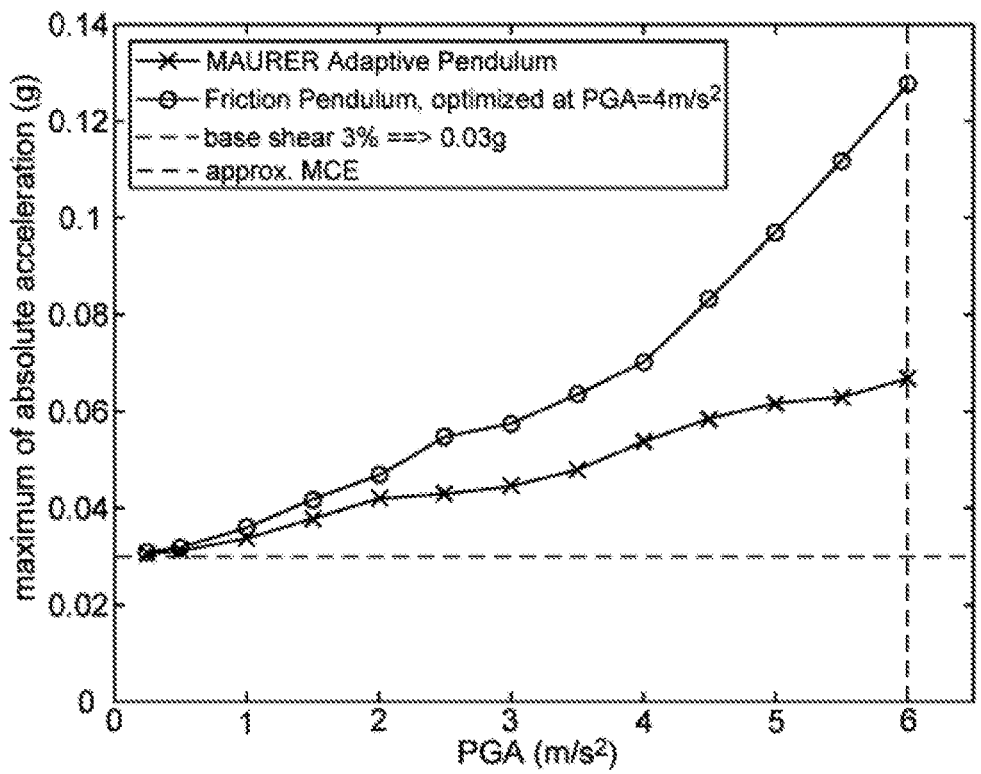
FIG. 5A shows schematically a diagram in which the course of the maximum absolute acceleration occurring in the construction ("maximum of absolute acceleration") as a function of the peak ground acceleration ("PGA") of a sliding pendulum bearing designed according to a second embodiment of the dimensioning method (cf. curve for "MAURER Adaptive Pendulum") in comparison to an already known comparable bearing (cf. curve for "Friction Pendulum")
Figure 5B:
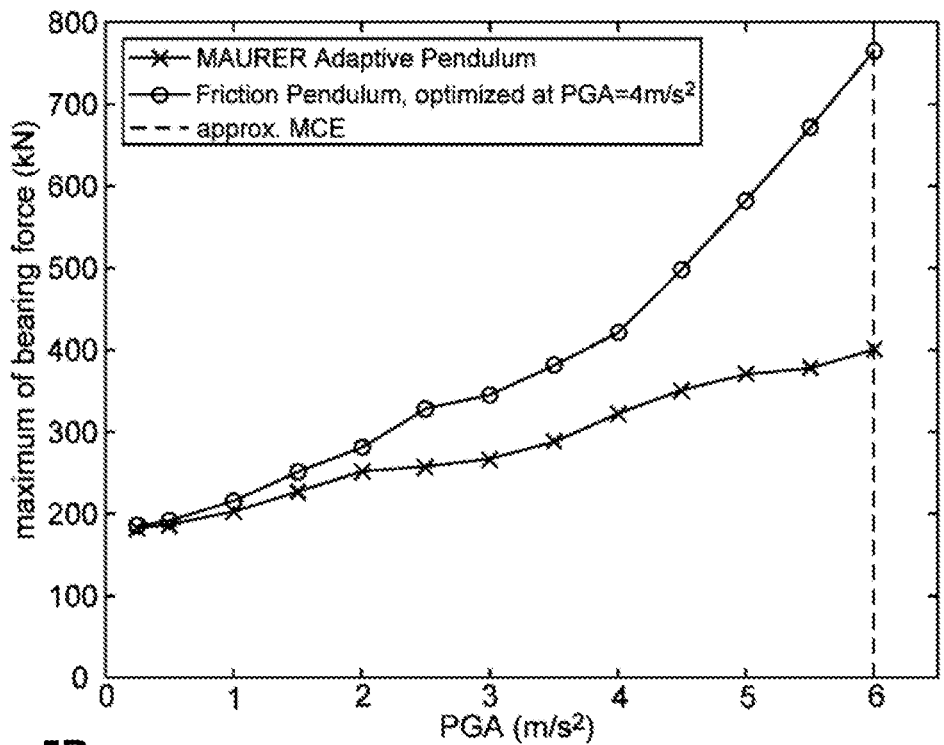
FIG. 5B shows schematically a diagram in which the course of the maximum horizontal bearing force ("maximum of bearing force") as a function of the peak ground acceleration ("PGA") of a sliding pendulum bearing designed according to the second embodiment of the dimensioning method (cf. curve for "MAURER Adaptive Pendulum in comparison to an already known comparable bearing (cf. curve for "Friction Pendulum")

As can be seen from the diagrams in FIGS. 5A and 5B, the values for the maximum absolute construction acceleration as well as for the maximum bearing force for the sliding pendulum bearing dimensioned according to the second embodiment (cf. curves for "Maurer Adaptive Pendulum") are significantly lower than for the corresponding sliding pendulum bearing of type Single (cf. curves for "Friction Pendulum"). This means an improved isolation behavior of the sliding pendulum bearing designed according to the second embodiment compared to the corresponding Single.

Figure 5C:
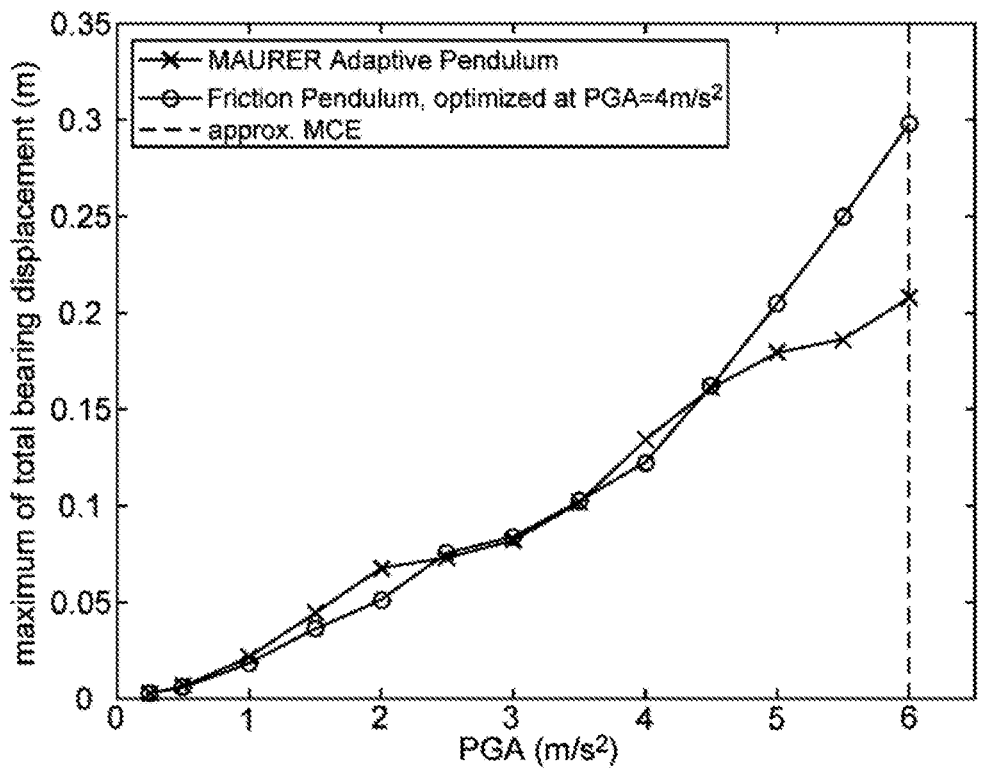
FIG. 5C shows schematically a diagram in which the course of the maximum occurring bearing displacement ("maximum of total bearing displacement") as a function of the peak ground acceleration ("PGA") of a sliding pendulum bearing dimensioned according to the second embodiment of the dimensioning method (cf. curve for "MAURER Adaptive Pendulum") in comparison to an already known comparable bearing (cf. curve for "Friction Pendulum")

The diagram in FIG. 5C shows that the maximum occurring bearing movements for the sliding pendulum bearing dimensioned in accordance with the second design example for small peak ground acceleration values are essentially identical with the maximum bearing movements of the corresponding single, but that considerably lower maximum bearing movements are achieved, especially with higher values for peak ground acceleration. Smaller bearing movements make it possible to provide less installation space for the corresponding sliding pendulum bearing and thus, in addition to reducing the cost of manufacturing the sliding pendulum due to lower material costs, also ensure more efficient utilization of the accessible installation space.

Figure 5D:
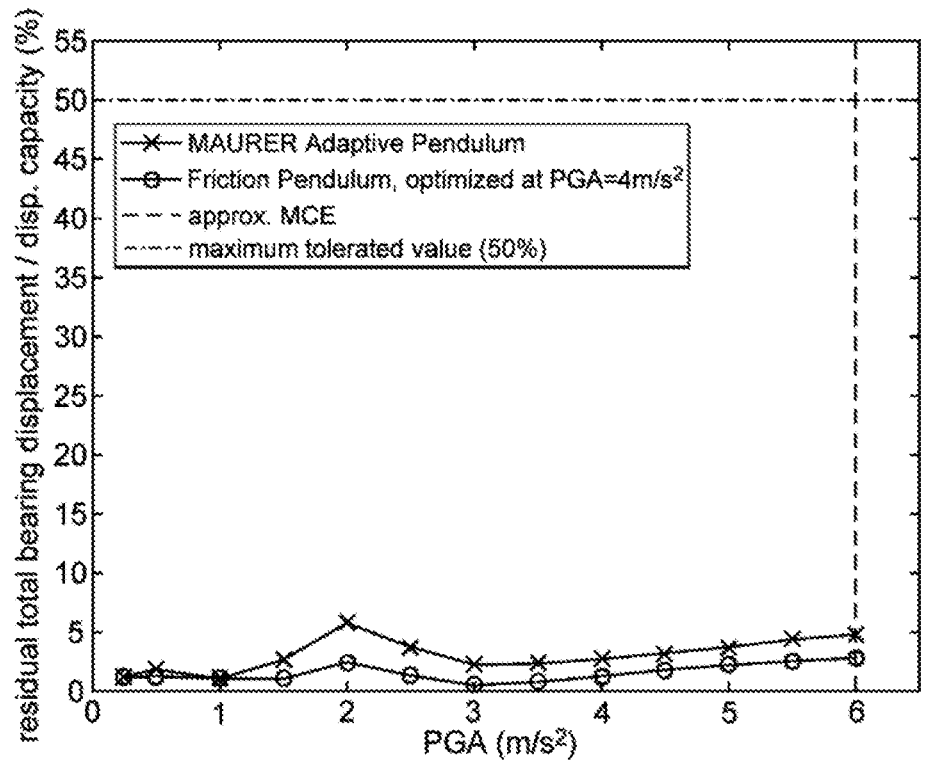
FIG. 5D shows schematically a diagram in which the course of the re-centering error ("residual total bearing displacement") as a function of the peak ground acceleration ("PGA") of a sliding pendulum bearing dimensioned in accordance with the second embodiment of the dimensioning method (cf. curve for "MAURER Adaptive Pendulum") in comparison with an already known comparable bearing (cf. curve for "Friction Pendulum")

The diagram shown in FIG. 5D shows that the improvements with regard to the maximum absolute construction accelerations and the maximum occurring bearing forces lead to an increase in the back centering errors. However, the occurring back centering errors for all relevant peak ground acceleration values are clearly below the limit of 50% and only slightly above the values for the corresponding sliding pendulum bearing type Single. However, this slight increase in the back centering error is more than compensated by the improvement in the isolation behaviour of the sliding pendulum bearing in relation to the maximum absolute construction accelerations and the maximum bearing forces occurring.

Of course, other specifications for the adjustment or optimization of the two main sliding surfaces are also possible, which make it possible to adapt the resulting sliding pendulum bearing to a large number of different requirements considerably better than the conventional sliding pendulum bearing and to realize a number of advantages, such as lower manufacturing costs, a smaller required installation space and lower maintenance costs.

This results in a multitude of adjustment and optimization possibilities for both the design of the sliding pendulum bearing itself and for the corresponding dimensioning method.

LIST OF REFERENCE CHARACTERS

1: first sliding plate
2: second sliding plate
3: slider
3a, 3b, 3c, 3d: slider part
4, 4a, 4b: sliding element
5: sliding pendulum bearing
10: first main sliding surface
20: second main sliding surface

The invention claimed is:

1. A sliding pendulum bearing for protecting a construction against dynamic stresses from predominantly horizontal earthquake excitation, having a first sliding plate, a second sliding plate and a slider movably arranged between both sliding plates, wherein each of the two sliding plates has a curved main sliding surface and the slider is in surface contact with a first main sliding surface of the first sliding plate and with a second main sliding surface of the second sliding plate, wherein the first main sliding surface is designed for a first load case and the second main sliding surface is designed for a second load case which differs from the first load case, wherein the first and the second load cases represent specific peak ground acceleration values of corresponding earthquakes, and wherein the first main sliding surface has a first effective radius of curvature $R_{eff,1}$ and the second main sliding surface has a second effective radius of curvature $R_{eff,2}$, wherein the sum of $R_{eff,1}$ and $R_{eff,2}$ is at least 1.4 times the effective radius of curvature of a sliding pendulum bearing having only one curved main sliding surface.

2. The sliding pendulum bearing according to claim 1, wherein the first main sliding surface is designed for a first load case with a value for a peak ground acceleration (PGA value) which corresponds at most to the PGA value of the maximum credible earthquake and at least to the PGA value of the design basis earthquake.

3. The sliding pendulum bearing according to claim 1, wherein $R_{eff,1}$ and $R_{eff,2}$ are each at least 0.7 times the effective radius of curvature of a sliding pendulum bearing having only one curved main sliding surface.

4. The sliding pendulum bearing according to claim 3, wherein the second effective radius of curvature $R_{eff,2}$ is in the range from 0.90 to 1.5 times the first effective radius of curvature $R_{eff,1}$ and is particularly preferably equal to the first effective radius of curvature $R_{eff,1}$.

5. The sliding pendulum bearing according to claim 1, wherein the first effective radius of curvature $R_{eff,1}$ approximately as large as for a sliding pendulum bearing with only one curved main sliding surface, and the second effective radius of curvature $R_{eff,2}$, in the range from 0.75 to 2 times the first effective radius of curvature $R_{eff,1}$.

6. The sliding pendulum bearing according to claim 5, wherein the second effective radius of curvature $R_{eff,2}$ is equal to the first effective radius of curvature $R_{eff,1}$.

7. The sliding pendulum bearing according to claim 1, wherein the first effective radius of curvature $R_{eff,1}$ in metres corresponds approximately to 0.25 times the square of a desired isolation cycle duration $T_{ISO}$ in seconds of the construction to be protected with the sliding pendulum bearing.

8. The sliding pendulum bearing according to claim 1, wherein the first main sliding surface has a first coefficient of friction $\mu_1$ for the friction with the slider which is approximately as large as for a sliding pendulum bearing having only one curved main sliding surface, and the second main sliding surface has a second coefficient of friction $\mu_2$ which is lower than $\mu_1$ and which is in the range from about 0.2% to 1.7% when the second main sliding surface is lubricated and in the range from about 2% to 3.5% when the second main sliding surface is not lubricated.

9. The sliding pendulum bearing according to claim 1, wherein the second main sliding surface has a limitation means for limiting the displacement capacity of the slider on the second main sliding surface, wherein the limitation means is designed as an annular abutment and the limitation means does not limit the total displacement capacity of the bearing.

10. The sliding pendulum bearing according to claim 9, wherein the limitation means is formed such that the displacement capacity $D_2$ of the slider on the second main sliding surface is substantially less than or equal to the displacement capacity $D_1$ of the slider on the first main sliding surface.

11. The sliding pendulum bearing according to claim 1, wherein the slider has two slider parts which are in surface contact with one another via a curved subsidiary sliding surface, wherein the first slider part is in contact with the first main sliding surface and the second slider part is in contact with the second main sliding surface.

12. The sliding pendulum bearing according to claim 11, wherein the sliding pendulum bearing has different sliding paths, different coefficients of friction and different effective radii on the two main sliding surfaces.

13. A method for dimensioning a sliding pendulum bearing for protecting a construction against dynamic stresses from predominantly horizontal earthquake excitation, having at least a first sliding plate, a second sliding plate and a slider movably arranged between both sliding plates, wherein each of the two sliding plates has a curved main sliding surface and the slider is in surface contact with a first main sliding surface of the first sliding plate and with a second main sliding surface of the second sliding plate, wherein the first main sliding surface is designed for a first load case and the second main sliding surface is designed for a second load case which differs from the first load case, wherein the first and the second load cases represent specific peak ground acceleration values of corresponding earthquakes, and wherein the first main sliding surface has a first effective radius of curvature $R_{eff,1}$ and the second main sliding surface has a second effective radius of curvature $R_{eff,2}$, wherein the sum of $R_{eff,1}$ and $R_{eff,2}$ is at least 1.4 times the effective radius of curvature of a sliding pendulum bearing having only one curved main sliding surface.

14. The method for dimensioning according to claim 13, wherein the slider has two slider parts which are in surface contact with one another via a curved subsidiary sliding surface, wherein the first slider part is in contact with the first main sliding surface and the second slider part is in contact with the second main sliding surface.

15. The method for dimensioning according to claim 13, wherein the first main sliding surface is designed for a first load case with a value for a peak ground acceleration (PGA value) which corresponds at most to the PGA value of the maximum credible earthquake and at least to the PGA value of the design basis earthquake.

16. The method for dimensioning according to claim 13, wherein in a first step, a first effective radius of curvature $R_{eff,1}$ and a first friction value $\mu_1$ are determined for the first main sliding surface under the assumption that the sliding pendulum bearing has only one single main sliding surface, wherein the second effective radius of curvature $R_{eff,2}$ is selected in the range from 0.75 to 2 times the radius of curvature of the first main sliding surface, and a second coefficient of friction $\mu_2$ is selected for the second main sliding surface, wherein the second coefficient of friction $\mu_2$ is selected between 0.2% and 2.0% of the first effective coefficient of friction $\mu_1$, in order to ensure a predefined minimum shear resistance.

17. The method for dimensioning according to claim 16, wherein the second effective radius of curvature $R_{eff,2}$ is selected in the range from 0.75 to 1.5 times the radius of curvature of the first main sliding surface.

18. The method for dimensioning according to claim 16, wherein the second coefficient of friction $\mu_2$ is selected between 0.4% and 1.5% of the first effective coefficient of friction $\mu_1$.

19. The method for dimensioning according to claim 18, wherein the second coefficient of friction $\mu_2$ is selected between 0.6% and 1.25%, or which is less than or equal to the first effective coefficient of friction $\mu_1$.

20. A sliding pendulum bearing for protecting a construction against dynamic stresses from predominantly horizontal earthquake excitation, having a first sliding plate, a second sliding plate and a slider movably arranged between both sliding plates, wherein each of the two sliding plates has a curved main sliding surface and the slider is in surface contact with a first main sliding surface of the first sliding plate and with a second main sliding surface of the second sliding plate, wherein the first main sliding surface is designed for a first load case and the second main sliding surface is designed for a second load case which differs from the first load case, wherein the first and the second load cases represent specific peak ground acceleration values of corresponding earthquakes, wherein a first effective radius of curvature $R_{\mathit{eff},1}$ of the first main sliding surface in metres corresponds approximately to 0.25 times the square of a desired isolation cycle duration $T_{\mathit{ISO}}$ in seconds of the construction to be protected with sliding pendulum bearing.

21. A sliding pendulum bearing for protecting a construction against dynamic stresses from predominantly horizontal earthquake excitation, having a first sliding plate, a second sliding plate and a slider movably arranged between both sliding plates, wherein each of the two sliding plates has a curved main sliding surface and the slider is in surface contact with a first main sliding surface of the first sliding plate and with a second main sliding surface of the second sliding plate, wherein the first main sliding surface is designed for a first load case and the second main sliding surface is designed for a second load case which differs from the first load case, wherein the first and the second load cases represent specific peak ground acceleration values of corresponding earthquakes, wherein the first main sliding surface has a first coefficient of friction $\mu_1$ for the friction with the slider which is approximately as large as for a sliding pendulum bearing having only one curved main sliding surface, and the second main sliding surface has a second coefficient of friction $\mu_2$ which is lower than $\mu_1$ and which is in the range from about 0.2% to 1.7% when the second main sliding surface is lubricated and in the range from about 2% to 3.5% when the second main sliding surface is not lubricated.

22. A sliding pendulum bearing for protecting a construction against dynamic stresses from predominantly horizontal earthquake excitation, having a first sliding plate, a second sliding plate and a slider movably arranged between both sliding plates, wherein each of the two sliding plates has a curved main sliding surface and the slider is in surface contact with a first main sliding surface of the first sliding plate and with a second main sliding surface of the second sliding plate, wherein the first main sliding surface is designed for a first load case and the second main sliding surface is designed for a second load case which differs from the first load case, wherein the first and the second load cases represent specific peak ground acceleration values of corresponding earthquakes, wherein the second main sliding surface has a limitation means for limiting the displacement capacity of the slider on the second main sliding surface, wherein the limitation means is designed in particular as an annular abutment and the limitation means does not limit the total displacement capacity of the bearing.

* * * * *